US009961370B2

(12) United States Patent
Chen et al.

(10) Patent No.: US 9,961,370 B2
(45) Date of Patent: May 1, 2018

(54) METHOD AND APPARATUS OF VIEW SYNTHESIS PREDICTION IN 3D VIDEO CODING

(71) Applicant: HFI Innovation Inc., Zhubei, Hsinchu County (TW)

(72) Inventors: Yi-Wen Chen, Taichung (TW); Jicheng An, Beijing (CN); Jian-Liang Lin, Su'ao Township, Yilan County (TW)

(73) Assignee: HFI Innovation Inc., Zhubei (TW)

( * ) Notice: Subject to any disclaimer, the term of this patent is extended or adjusted under 35 U.S.C. 154(b) by 22 days.

(21) Appl. No.: 14/762,861

(22) PCT Filed: Apr. 2, 2014

(86) PCT No.: PCT/CN2014/074598
§ 371 (c)(1),
(2) Date: Jul. 23, 2015

(87) PCT Pub. No.: WO2014/166348
PCT Pub. Date: Oct. 16, 2014

(65) Prior Publication Data
US 2015/0382019 A1 Dec. 31, 2015

(30) Foreign Application Priority Data

Apr. 9, 2013 (WO) ............... PCT/CN2013/073977

(51) Int. Cl.
*H04N 19/597* (2014.01)
*H04N 19/196* (2014.01)
(Continued)

(52) U.S. Cl.
CPC ....... *H04N 19/597* (2014.11); *H04N 13/0048* (2013.01); *H04N 19/196* (2014.11);
(Continued)

(58) Field of Classification Search
CPC .............................. H04N 19/597; H04N 19/52
(Continued)

(56) References Cited

U.S. PATENT DOCUMENTS 6,055,274 A * 4/2000 McVeigh ............. H04N 19/597
 348/43
7,728,877 B2 * 6/2010 Xin ....................... H04N 19/597
 348/218.1
(Continued)

FOREIGN PATENT DOCUMENTS

CN 101601304 12/2009
CN 102055982 5/2011
WO WO 2012/171477 12/2012

OTHER PUBLICATIONS

Overview of the Stereo and Multiview Video coding Extensions of the H.264-MPEG-4 AVC Standard; Vetro; Apr. 2011.*
(Continued)

*Primary Examiner* — Luis Perez Fuentes
(74) *Attorney, Agent, or Firm* — Oblon, McClelland, Maier & Neustadt, L.L.P.

(57) ABSTRACT

A method and apparatus for a three-dimensional encoding or decoding system incorporating view synthesis prediction (VSP) with reduced computational complexity and/or memory access bandwidth are disclosed. The system applies the VSP process to the texture data only and applies non-VSP process to the depth data. Therefore, when a current texture block in a dependent view is coded according to VSP by backward warping the current texture block to the reference picture using an associated depth block and the motion parameter inheritance (MPI) mode is selected for the corresponding depth block in the dependent view, the corresponding depth block in the dependent view is encoded or
(Continued)

decoded using non-VSP inter-view prediction based on motion information inherited from the current texture block.

11 Claims, 6 Drawing Sheets

(51) Int. Cl.
    *H04N 19/52*     (2014.01)
    *H04N 19/463*     (2014.01)
    *H04N 13/00*     (2018.01)
    *H04N 19/513*     (2014.01)

(52) U.S. Cl.
    CPC ......... *H04N 19/197* (2014.11); *H04N 19/463* (2014.11); *H04N 19/513* (2014.11); *H04N 19/52* (2014.11)

(58) Field of Classification Search
    USPC .......................................................... 375/240
    See application file for complete search history.

(56) References Cited

U.S. PATENT DOCUMENTS

| | | | | |
|---|---|---|---|---|
| 8,532,410 | B2* | 9/2013 | Tian | H04N 19/597 382/232 |
| 8,559,515 | B2* | 10/2013 | Ha | H04N 19/597 375/240.01 |
| 8,842,729 | B2* | 9/2014 | Su | H04N 19/597 375/240.12 |
| 9,118,929 | B2* | 8/2015 | Lin | H04N 19/56 |
| 9,204,163 | B2* | 12/2015 | Kim | H04N 19/56 |
| 9,237,345 | B2* | 1/2016 | Kang | H04N 19/597 |
| 9,253,486 | B2* | 2/2016 | Tian | H04N 13/0048 |
| 2008/0170618 | A1* | 7/2008 | Choi | H04N 13/0022 375/240.16 |
| 2014/0218473 | A1* | 8/2014 | Hannuksela | H04N 19/597 348/43 |
| 2014/0286421 | A1* | 9/2014 | Kang | H04N 19/597 375/240.16 |
| 2014/0301463 | A1* | 10/2014 | Rusanovskyy | H04N 19/52 375/240.14 |
| 2015/0358599 | A1* | 12/2015 | Lin | H04N 19/597 348/47 |
| 2015/0382019 | A1* | 12/2015 | Chen | H04N 19/597 348/43 |

OTHER PUBLICATIONS

View Synthesis for Multiview Video Compression; Martimian; 2006.*
WD 1—HEVC Coding Standard—3rd Meeting Guangzhou CN Oct. 7-15, 2010; JCTVC-C403; Wiegand.*
Depth-based Coding of MVD Data for 3D Video Extension of H.264 AVC; Rusanovskyy, 2013.*
Backward View Synthesis Prediction for 3D HEVC; Tian, 2013.*
WD 1—HEVC Coding Standard—3rd Meeting Guangzhou CN Oct. 7-15, 2010; JCTVC-C403.*
Overview of the Stereo and Multiview Video coding Extensions of the H.264-MPEG-4 AVC Standard; Apr. 2011.*
Google search for NPL log.*
WP 3—3D-HEVC Test model 2, Wegner; Oct. 2012.*
Backward View Synthesis Prediction using Neighboring Blocks; Tian; Jan. 16, 2013.*
Backward View Synthesis Prediction for 3D HEVC; Zou; Set-2013.*
International Search Report dated Jul. 1, 2014, issued in application No. PCT/CN2014/074598.
Tian, D., et al.; "CE1.h Backward View Synthesis Prediction using Neighbouring Blocks;" Joint Collaborative Team on 3D Video Coding Extension Development of ITU-T SG 16 WP 3 and ISO/IEC JTC 1/SC 29/WG 11; Jan. 2013; pp. 1-6.
Hannuksela, M.M.; "Test Model under Consideration for AVC based 3D video (3DV-ATM);" International Organisation for Standardisation; Dec. 2011; pp. 1-16.
Tech, G., et al.; "3D-HEVC Test Model 3;" Joint Collaborative Team on 3D Video Coding Extension Development of ITU-T SG 16 WP 3 and ISO/IEC JTC 1/SC 29/WG 11; Jan. 2013; pp. 1-52.
Zou, F., et al.; "CE1.h Results on View Synthesis Prediction;" Joint Collaborative Team on 3D Video Coding Extension Development of ITU-T SG 16 WP 3 and ISO/IEC JTC 1/SC 29/WG 11; Oct. 2012; pp. 1-12.
Shimizu, S., et al.; "3D-CE1.h Results on View Synthesis Prediction;" Joint Collaborative Team on 3D Video Coding Extension Development of ITU-T SG 16 WP 3 and ISO/IEC JTC 1/SC 29/WG 11; Jul. 2012; pp. 1-8.
Su, W., et al.; "3DV-CE1.a: Block-based View Synthesis Prediction for 3DV-ATM;" Joint Collaborative Team on 3D Video Coding Extension Development of ITU-T SG 16 WP 3 and ISO/IEC JTC 1/SC 29/ WG 11; Jul. 2012; pp. 1-5

* cited by examiner

METHOD AND APPARATUS OF VIEW SYNTHESIS PREDICTION IN 3D VIDEO CODING

CROSS REFERENCE TO RELATED APPLICATIONS

The present invention is a National Phase Application of PCT Application No. PCT/CN2014/074598, filed on Apr. 2, 2014, which claims priority to PCT Patent Application, Serial No. PCT/CN2013/073977, filed on Apr. 9, 2013, entitled "Refinement of View Synthesis Prediction (VSP) for 3-D Video Coding". The PCT Patent Applications are hereby incorporated by reference in their entireties.

TECHNICAL FIELD

The present invention relates to three-dimensional video coding. In particular, the present invention relates to view synthesis prediction for texture and depth data in a three-dimensional (3D) coding system.

BACKGROUND

Three-dimensional (3D) television has been a technology trend in recent years that intends to bring viewers sensational viewing experience. Various technologies have been developed to enable 3D viewing. Among them, the multi-view video is a key technology for 3DTV application among others. The traditional video is a two-dimensional (2D) medium that only provides viewers a single view of a scene from the perspective of the camera. However, the multi-view video is capable of offering arbitrary viewpoints of dynamic scenes and provides viewers the sensation of realism.

The multi-view video is typically created by capturing a scene using multiple cameras simultaneously, where the multiple cameras are properly located so that each camera captures the scene from one viewpoint. Accordingly, the multiple cameras will capture multiple video sequences corresponding to multiple views. In order to provide more views, more cameras have been used to generate multi-view video with a large number of video sequences associated with the views. Accordingly, the multi-view video will require a large storage space to store and/or a high bandwidth to transmit. Therefore, multi-view video coding techniques have been developed in the field to reduce the required storage space or the transmission bandwidth.

A straightforward approach may be to simply apply conventional video coding techniques to each single-view video sequence independently and disregard any correlation among different views. Such coding system would be very inefficient. In order to improve efficiency of multi-view video coding, typical multi-view video coding exploits inter-view redundancy. Therefore, most 3D Video Coding (3DVC) systems take into account of the correlation of video data associated with multiple views and depth maps. The standard development body, the Joint Video Team of the ITU-T Video Coding Experts Group (VCEG) and the ISO/IEC Moving Picture Experts Group (MPEG), extended H.264/MPEG-4 AVC to multi-view video coding (MVC) for stereo and multi-view videos.

The MVC adopts both temporal and spatial predictions to improve compression efficiency. During the development of MVC, some macroblock-level coding tools are proposed, including illumination compensation (IC), adaptive reference filtering, motion skip mode, and view synthesis prediction (VSP). These coding tools are proposed to exploit the redundancy between multiple views. Illumination compensation is intended for compensating the illumination variations between different views. Adaptive reference filtering is intended to reduce the variations due to focus mismatch among the cameras. Motion skip mode allows the motion vectors in the current view to be inferred from the other views. View synthesis prediction is applied to predict a picture of the current view from other views.

In the reference software for HEVC based 3D video coding (3D-HTM), inter-view candidate is added as a motion vector (MV) or disparity vector (DV) candidate for Inter, Merge and Skip mode in order to re-use previously coded motion information of adjacent views. In 3D-HTM, the basic unit for compression, termed as coding unit (CU), is a 2N×2N square block. Each CU can be recursively split into four smaller CUs until a predefined minimum size is reached. Each CU contains one or more prediction units (PUs).

To share the previously coded texture information of adjacent views, a technique known as Disparity-Compensated Prediction (DCP) has been included in 3D-HTM as an alternative coding tool to motion-compensated prediction (MCP). MCP refers to an inter-picture prediction that uses previously coded pictures of the same view, while DCP refers to an inter-picture prediction that uses previously coded pictures of other views in the same access unit. FIG. 1 illustrates an example of 3D video coding system incorporating MCP and DCP. The vector (110) used for DCP is termed as disparity vector (DV), which is analog to the motion vector (MV) used in MCP. FIG. 1 illustrates three MVs (120, 130 and 140) associated with MCP. Moreover, the DV of a DCP block can also be predicted by the disparity vector predictor (DVP) candidate derived from neighboring blocks or the temporal collocated blocks that also use inter-view reference pictures. In 3D-HTM version 3.1, when deriving an inter-view Merge candidate for Merge/Skip modes, if the motion information of corresponding block is not available or not valid, the inter-view Merge candidate is replaced by a DV.

Inter-view residual prediction is another coding tool used in 3D-HTM. To share the previously coded residual information of adjacent views, the residual signal of the current prediction block (i.e., PU) can be predicted by the residual signals of the corresponding blocks in the inter-view pictures as shown in FIG. 2. The corresponding blocks can be located by respective DVs. The video pictures and depth maps corresponding to a particular camera position are indicated by a view identifier (i.e., V0, V1 and V2 in FIG. 2). All video pictures and depth maps that belong to the same camera position are associated with the same viewId (i.e., view identifier). The view identifiers are used for specifying the coding order within the access units and detecting missing views in error-prone environments. An access unit includes all video pictures and depth maps corresponding to the same time instant. Inside an access unit, the video picture and, when present, the associated depth map having viewId equal to 0 are coded first, followed by the video picture and depth map having viewId equal to 1, etc. The view with viewId equal to 0 (i.e., V0 in FIG. 2) is also referred to as the base view or the independent view. The base view video pictures can be coded using a conventional HEVC video coder without dependence on other views.

As can be seen in FIG. 2, for the current block, motion vector predictor (MVP)/disparity vector predictor (DVP) can be derived from the inter-view blocks in the inter-view pictures. In the following, inter-view blocks in inter-view picture may be abbreviated as inter-view blocks. The derived candidate is termed as inter-view candidates, which can be inter-view MVPs or DVPs. The coding tools that codes the motion information of a current block (e.g., a current prediction unit, PU) based on previously coded motion information in other views is termed as inter-view motion parameter prediction. Furthermore, a corresponding block in a neighboring view is termed as an inter-view block and the inter-view block is located using the disparity vector derived from the depth information of current block in current picture.

The example shown in FIG. 2 corresponds to a view coding order from V0 (i.e., base view) to V1, and followed by V2. The current block in the current picture being coded is in V2. According to HTM3.1, all the MVs of reference blocks in the previously coded views can be considered as an inter-view candidate even if the inter-view pictures are not in the reference picture list of current picture. In FIG. 2, frames 210, 220 and 230 correspond to a video picture or a depth map from views V0, V1 and V2 at time t1 respectively. Block 232 is the current block in the current view, and blocks 212 and 222 are the current blocks in V0 and V1 respectively. For current block 212 in V0, a disparity vector (216) is used to locate the inter-view collocated block (214). Similarly, for current block 222 in V1, a disparity vector (226) is used to locate the inter-view collocated block (224). According to HTM-3.1, the motion vectors or disparity vectors associated with inter-view collocated blocks from any coded views can be included in the inter-view candidates. Therefore, the number of inter-view candidates can be rather large, which will require more processing time and large storage space. It is desirable to develop a method to reduce the processing time and or the storage requirement without causing noticeable impact on the system performance in terms of BD-rate or other performance measurement.

In 3DV-HTM version 3.1, a disparity vector can be used as a DVP candidate for Inter mode or as a Merge candidate for Merge/Skip mode. A derived disparity vector can also be used as an offset vector for inter-view motion prediction and inter-view residual prediction. When used as an offset vector, the DV is derived from spatial and temporal neighboring blocks as shown in FIG. 3. Multiple spatial and temporal neighboring blocks are determined and DV availability of the spatial and temporal neighboring blocks is checked according to a pre-determined order. This coding tool for DV derivation based on neighboring (spatial and temporal) blocks is termed as Neighboring Block DV (NBDV). As shown in FIG. 3A, the spatial neighboring block set includes the location diagonally across from the lower-left corner of the current block (i.e., A0), the location next to the left-bottom side of the current block (i.e., A1), the location diagonally across from the upper-left corner of the current block (i.e., B2), the location diagonally across from the upper-right corner of the current block (i.e., B0), and the location next to the top-right side of the current block (i.e., B1). As shown in FIG. 3B, the temporal neighboring block set includes the location at the center of the current block (i.e., $B_{CTR}$) and the location diagonally across from the lower-right corner of the current block (i.e., RB) in a temporal reference picture. Instead of the center location, other locations (e.g., a lower-right block) within the current block in the temporal reference picture may also be used. In other words, any block collocated with the current block can be included in the temporal block set. Once a block is identified as having a DV, the checking process will be terminated. An exemplary search order for the spatial neighboring blocks in FIG. 3A is (A1, B1, B0, A0, B2). An exemplary search order for the temporal neighboring blocks for the temporal neighboring blocks in FIG. 3B is (BR, $B_{CTR}$). The spatial and temporal neighboring blocks are the same as the spatial and temporal neighboring blocks of Inter mode (AMVP) and Merge modes in HEVC.

If a DCP coded block is not found in the neighboring block set (i.e., spatial and temporal neighboring blocks as shown in FIGS. 3A and 3B), the disparity information can be obtained from another coding tool (DV-MCP). In this case, when a spatial neighboring block is MCP coded block and its motion is predicted by the inter-view motion prediction, as shown in FIG. 4, the disparity vector used for the inter-view motion prediction represents a motion correspondence between the current and the inter-view reference picture. This type of motion vector is referred to as inter-view predicted motion vector and the blocks are referred to as DV-MCP blocks. FIG. 4 illustrates an example of a DV-MCP block, where the motion information of the DV-MCP block (410) is predicted from a corresponding block (420) in the inter-view reference picture. The location of the corresponding block (420) is specified by a disparity vector (430). The disparity vector used in the DV-MCP block represents a motion correspondence between the current and inter-view reference picture. The motion information (422) of the corresponding block (420) is used to predict motion information (412) of the current block (410) in the current view.

To indicate whether a MCP block is DV-MCP coded and to store the disparity vector for the inter-view motion parameters prediction, two variables are used to represent the motion vector information for each block:
  dvMcpFlag, and
  dvMcpDisparity.
When dvMcpFlag is equal to 1, the dvMcpDisparity is set to indicate that the disparity vector is used for the inter-view motion parameter prediction. In the construction process for the Inter mode (AMVP) and Merge candidate list, the dvMcpFlag of the candidate is set to 1 if the candidate is generated by inter-view motion parameter prediction and is set to 0 otherwise. The disparity vectors from DV-MCP blocks are used in following order: A0, A1, B0, B1, B2, Col (i.e., Collocated block, $B_{CTR}$ or RB).

A method to enhance the NBDV by extracting a more accurate disparity vector (referred to as a refined DV in this disclosure) from the depth map is utilized in current 3D-HEVC. A depth block from coded depth map in the same access unit is first retrieved and used as a virtual depth of the current block. This coding tool for DV derivation is termed as Depth-oriented NBDV (DoNBDV). While coding the texture in view 1 and view 2 with the common test condition, the depth map in view 0 is already available. Therefore, the coding of texture in view 1 and view 2 can be benefited from the depth map in view 0. An estimated disparity vector can be extracted from the virtual depth shown in FIG. 5. The overall flow is as following:

1. Use an estimated disparity vector, which is determined according to the NBDV method in current 3D-HTM, to locate the corresponding depth block in the coded view.
  2. Use the corresponding depth in the coded view for current block (coding unit) as virtual depth.
  3. Extract a disparity vector (i.e., a refined DV) for inter-view motion prediction from the maximum value in the virtual depth retrieved in the previous step.

In the example illustrated in FIG. 5, the coded depth map in view 0 is used to derive the DV for the texture frame in view 1 to be coded. A corresponding depth block (530) in the coded D0 is retrieved for the current block (CB, 510) according to the estimated disparity vector (540) and the location (520) of the current block of the coded depth map in view 0. The retrieved block (530) is then used as the virtual depth block (530') for the current block to derive the DV. The maximum value in the virtual depth block (530') is used to extract a disparity vector (the refined disparity vector) for inter-view motion prediction.

View synthesis prediction (VSP) is a technique to remove interview redundancies among video signal from different viewpoints, in which synthetic signal is used as references to predict a current picture. In 3D-AVC, a forward mapping VSP was originally proposed to provide a synthetic reference as follows. The texture and depth pair of a first view is coded and decoded first. A second view can be predicted by warping the first view to the second view position. Also, a VSP Skip/Direct mode and a context-based adaptive Skip flag positioning method were considered to use a skip_type flag to adaptively select a synthetic reference or a non-synthetic reference according to the Skip status of neighboring blocks. In 3D-ATM version 5.0, B-VSP is implemented to replace the original forward mapping VSP. A backward mapping view synthesis scheme is used by B-VSP, where the texture of a first view and the depth of a second view are coded and decoded, and the texture of the second view can be predicted by warping the texture of the first view to the second view position through the converted disparity vector (DV) from the depth of the second view. In 3D-HEVC test model, there exists a process to derive a disparity vector predictor. The derived disparity vector is then used to fetch a depth block in the depth image of the reference view. The fetched depth block has the same size of the current prediction unit (PU), and it will then be used to do backward warping for the current PU. In addition, the warping operation may be performed at a sub-PU level precision, such as 8×4 or 4×8 blocks. A maximum depth value in the corresponding depth sub-block is selected for a sub-PU block and used for warping all the pixels in the sub-PU block.

The conventional VSP being considered for 3D-AVC and 3D-HEVC is quite computational intensive and uses substantial system resources (e.g., system bandwidth associated with data access of the depth maps). FIG. 6 illustrates the process involved in VSP in conventional 3D-HEVC, HTM-6.0. First, DoNBDV is utilized to derive the refined DV for the VSP process. As described earlier, the DoNBDV process comprises deriving a DV according to NBDV (610), locating the corresponding depth block (620) and deriving the refined DV (630). Upon the determination of the refined DV, another depth block is located (640) according to the refined DV. The depth block located using the refined DV is used as a virtual depth block by the VSP process to perform view synthesis prediction (650). As shown in FIG. 6, the DV is derived twice (in steps 610 and 630) and the depth data is accessed twice (in steps 620 and 640). It is desirable to develop more computational efficient and/or resource efficient VSP process (such lower system bandwidth usage) without any penalty on the performance.

SUMMARY

A method and apparatus for a three-dimensional encoding or decoding system incorporating view synthesis prediction (VSP) with reduced computational complexity and/or memory access bandwidth are disclosed. Embodiments according to the present invention apply VSP to the texture data only and apply non-VSP process to the depth data. Therefore, when a current texture block in a dependent view is coded according to VSP by backward warping the current texture block to the reference picture using an associated depth block and the motion parameter inheritance (MPI) mode is selected for the corresponding depth block in the dependent view, the corresponding depth block in the dependent view is encoded or decoded using non-VSP inter-view prediction based on motion information inherited from the current texture block.

The associated depth block can be located from a reference depth map in the dependent view according to the location of the current texture block and a selected disparity vector (DV). In one embodiment, the selected DV is derived using the NBDV process (Neighboring Block Disparity Vector process), where the selected DV is selected based on the first available DV from a set of neighboring blocks of the current texture block. In another embodiment, the selected DV is derived using DoNBDV process (Depth oriented Neighboring Block Disparity Vector process), wherein a derived DV is selected based on a first available DV from a set of neighboring blocks of the current texture block, a selected depth block is located from the reference depth map according to the derived DV and the location of the current texture block, and the selected DV is derived from a maximum value of the selected depth block. The selection process for the selected DV can be determined adaptively in a sequence level, picture level, slice level, LCU level (largest coding unit level), CU level (coding unit level), PU level (prediction unit level), Macroblock level, or sub-block level. In this case, a syntax element is used to indicate the selection process for the selected DV. The selection process for the selected DV may also be implicitly decided at encoder side and decoder side.

During the VSP data generation, the current texture block can be divided into texture sub-blocks and each sub-block is predicted by sub-block VSP data generated by backward warping said each texture sub-block to the reference picture using the associated depth block. The VSP process can be applied on the prediction unit (PU) basis, where the current texture block corresponds to a PU.

Another embodiment uses the NBDV process for VSP coded blocks and uses the DoNBDV process for other blocks coded by inter-view candidate in Merge mode or inter-view residual prediction. An exemplary method comprises receiving a reference picture in a reference view, receiving input data associated with a first texture block and a second texture block in a dependent view, deriving a first disparity vector (DV) from a set of neighboring blocks of the first texture block to locate a first depth block from a reference depth map in the reference view, generating VSP data for the first texture block by backward warping the first texture block to the reference picture using the first depth block, and encoding or decoding the first texture block using the VSP data. A second DV is derived from a set of neighboring blocks of the second texture block, and a refined DV is derived from a maximum value of a second depth block located according to the second DV. An inter-view Merge candidate or inter-view residual prediction is derived using the refined DV and a location of the second texture block to locate a refined depth block from the reference depth map. The second texture block is encoded or decoded using the inter-view Merge candidate or inter-view residual prediction.

DETAILED DESCRIPTION

As mentioned before, the VSP process in the conventional AVC or HEVC based three-dimensional video coding is quite computational and memory access intensive. Accordingly, embodiments of the present invention develop a simplified VSP process to reduce the computational complexity and/or the memory access bandwidth. In one embodiment, the memory bandwidth to access the depth map is reduced by directly using the DV determined by NBDV to fetch the depth block for VSP data generation instead of further deriving a refined DV based on the DoNBDV (Depth oriented Neighboring Block Disparity Vector process) method and using the refined DV to locate the virtual depth block for VSP data generation. In another embodiment, the simplified process for locating the depth block by direct use of the DV determined from NBDV for fetching the depth block is applied for the VSP coding tool. For at least one of other three-dimensional coding tools such as derivation of an inter-view Merge candidate, AMVP (Inter mode) and inter-view residual prediction, the more computational and memory access intensive DV derivation based on DoNBDV may still be used. According to the present invention, it only requires to access the depth map once for each VSP coded block. In the simplified VSP data generation process, a corresponding depth block is located using the DV determined from the NBDV process for VSP data generation. VSP data is then generated for each sub-block of the current texture block by backward warping the sub-block to the reference picture in a reference view using a converted DV derived from the maximum depth value of the corresponding depth sub-block.

Figure 1:
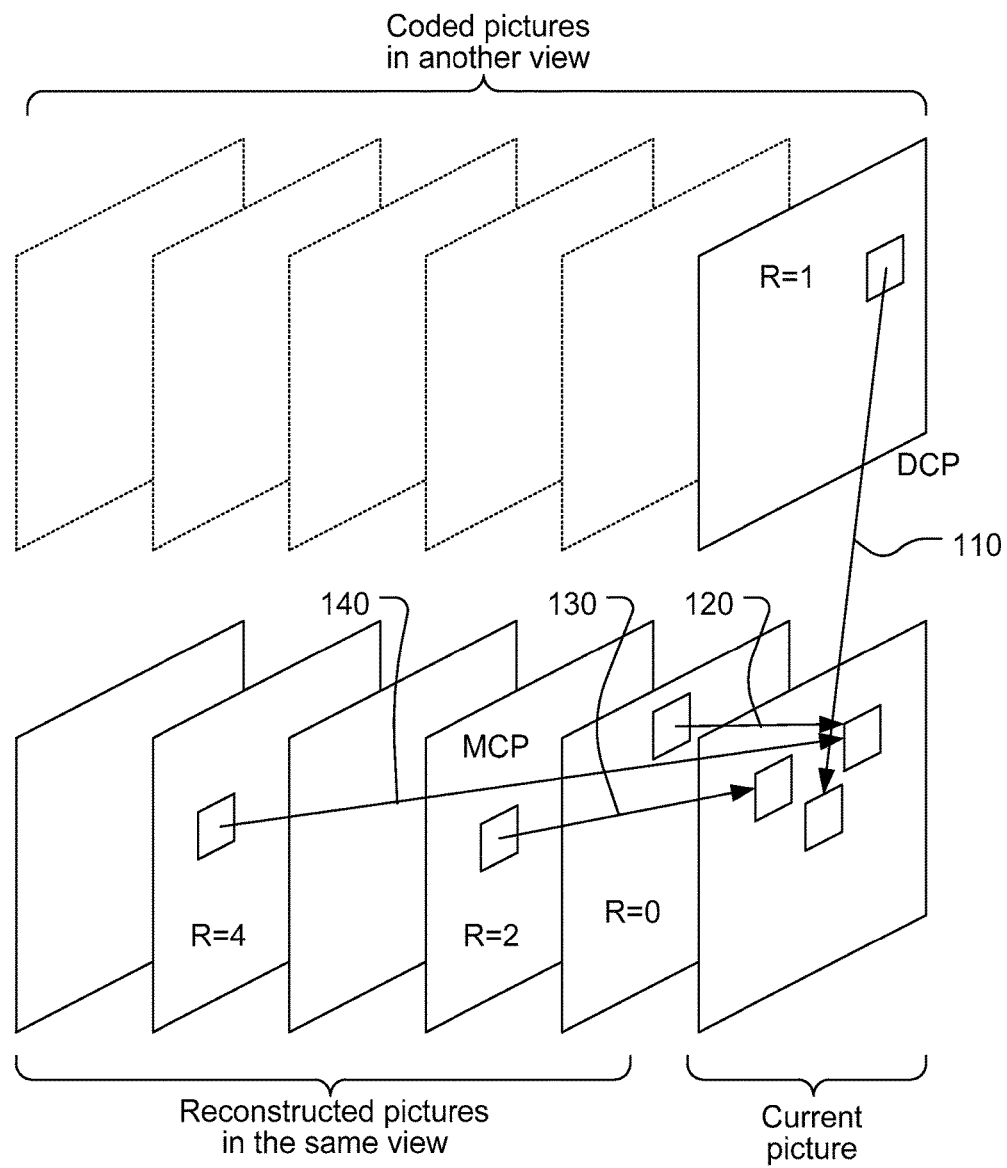
FIG. 1 illustrates an example of three-dimensional coding incorporating disparity-compensated prediction (DCP) as an alternative to motion-compensated prediction (MCP).
Figure 2:
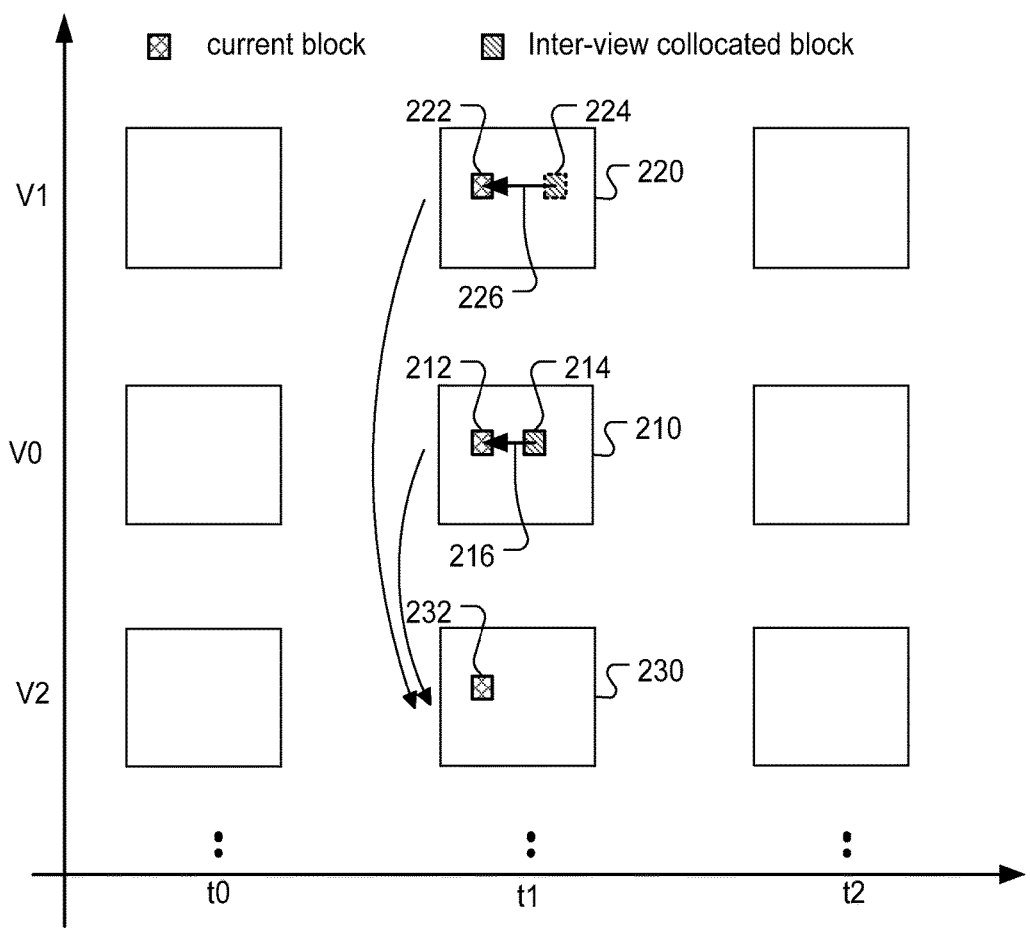
FIG. 2 illustrates an example of three-dimensional coding utilizing previously coded information or residual information from adjacent views in HTM-3.1.
Figure 3A:
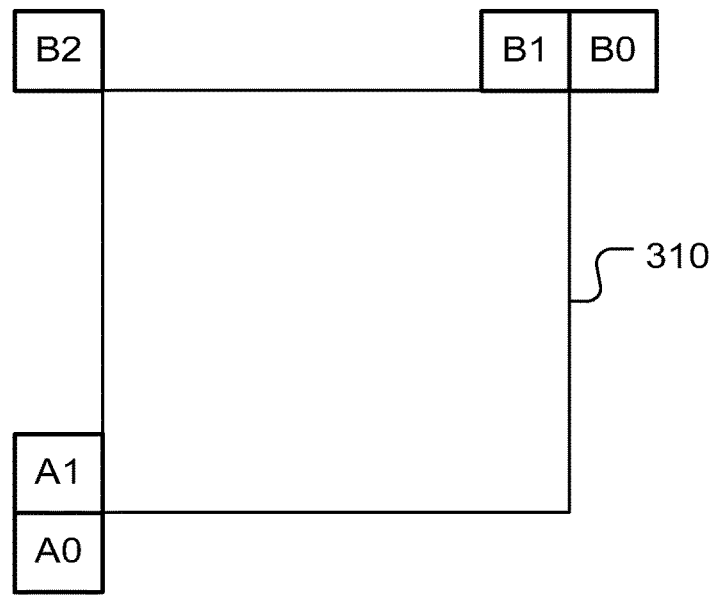
FIGS. 3A-B illustrate respective spatial neighboring blocks and temporal neighboring blocks of a current block for deriving a disparity vector for the current block in HTM-3.1.
Figure 3B:
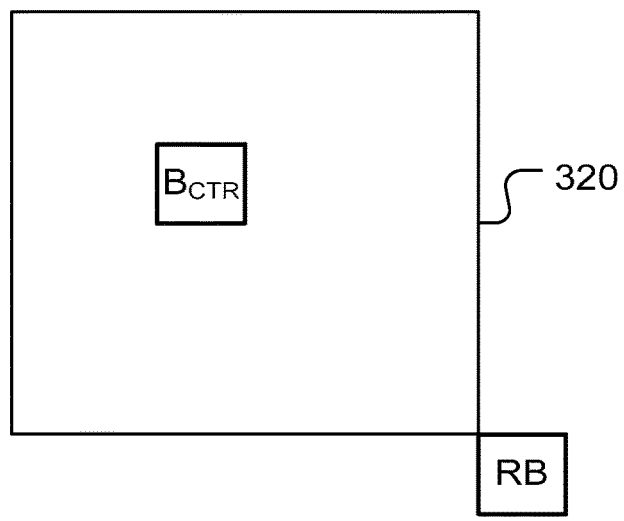
Figure 4:
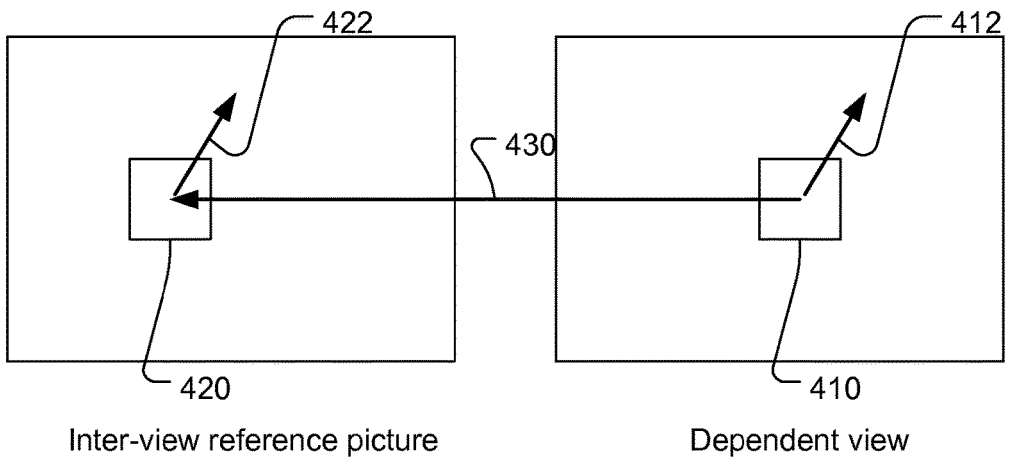
FIG. 4 illustrates an example of a disparity derivation from motion-compensated prediction (DV-MCP) block, where the location of the corresponding blocks is specified by a disparity vector.
Figure 5:
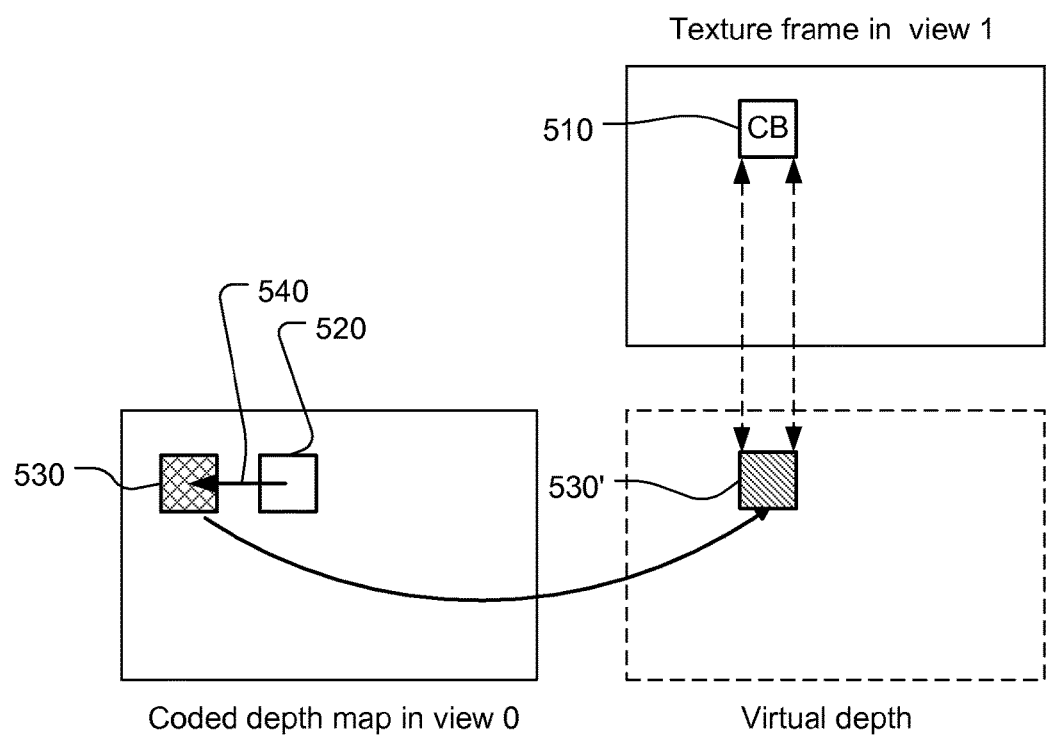
FIG. 5 illustrates an example of derivation of an estimated disparity vector based on the virtual depth of the block.
Figures 6, 7:
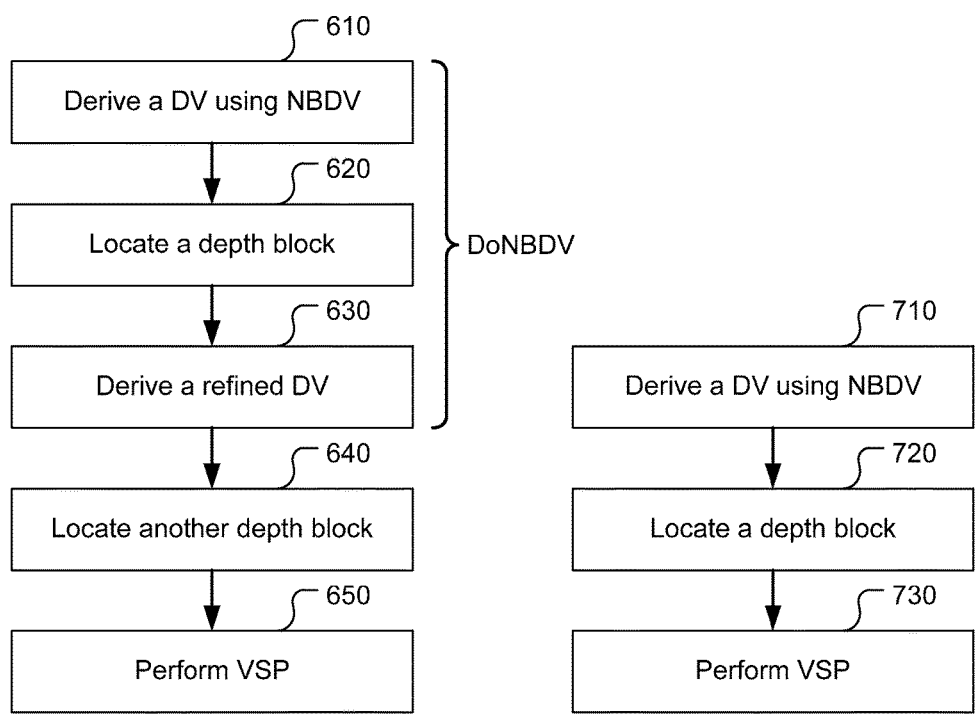
FIG. 6 illustrates the view synthesis prediction process according to the existing three-dimensional coding based on HEVC (High Efficiency Video Coding).
FIG. 7 illustrates exemplary simplified view synthesis prediction process according to the present invention.

FIG. 7 illustrates the process involved in VSP according to an embodiment of the present invention. A DV is derived according to NBDV (710), and the derived DV is used to locate a corresponding depth block (720). The depth block located using the derived DV is used as a virtual depth block by the VSP process to perform view synthesis prediction (730). Comparing to the VSP process in FIG. 6, the DV is only derived once thus the depth data is accessed once.

In order to improve the coding gain for VSP, the method to locate the depth block could be adaptively determined at a sequence level (e.g., sequence parameter set, SPS), view level (e.g., view parameter set, VPS), picture level (e.g., picture parameter set, PPS), slice level (e.g., slice header), coding unit (CU) level or prediction unit (PU) level. Additional syntax may be signaled at a corresponding level or an upper level to signal the selection among a set of predefined DV derivation methods such as NBDV and DoNBDV to retrieve the depth block for VSP data generation. Alternatively, the DV derivation method to locate the reference depth block can be implicitly determined at both encoder and decoder.

In the conventional 3D-HEVC (HTM 6.0), the VSP can be used for both texture and depth map coding. In the motion parameter inheritance (MPI) mode, if the collocated texture block uses VSP mode, current depth map PU will also use VSP mode according the conventional 3D-HEVC.

In one embodiment of the present invention, the VSP mode for depth map coding is disabled. When the motion parameter inheritance (MPI) mode is selected and if the collocated texture block uses VSP mode, the current depth PU will inherit the motion information (e.g., motion vectors, reference pictures) of the collocated texture block instead of using VSP. Accordingly, the current depth PU performs the motion compensation or disparity compensation directly based on the inherited motion information instead of using the VSP mode. Usually the disparity vectors and the associated motion information will be stored for a texture VSP coded block. Therefore, the depth block may use the motion information from the collocated texture block. For example, the disparity vector, reference index and view index for the current depth PU may be inherited from the collocated texture block to perform any non-VSP process. For example, the current depth block may be coded using disparity compensated prediction. Furthermore, the reference picture is set to the base-view or the picture that the motion vector is pointing to when the inherited reference picture index equals to −1.

The performance of a 3D/multi-view video coding system incorporating an embodiment of the present invention, is compared with the performance of a conventional system based on HTM-6.0 as shown in Table 1, where the VSP process for the depth map is disabled. The performance comparison is based on different sets of test data listed in the first column. The BD-rate differences are shown for texture pictures in view 1 (video 1) and view 2 (video 2). A negative value in the BD-rate implies that the present invention has a better performance. As shown in Table 1, the bitrate measure for the total bitrate (texture bitrate and depth bitrate) and the total bitrate for coded and synthesized video (synth./total bitrate) is about the same as the conventional HTM-6.0. The processing times (encoding time, decoding time and rendering time) are also compared. As shown in Table 1, slight decrease in decoding time (1.5% in average) is noted. Accordingly, the system that disables VSP for depth map coding achieves about the same performance as the conventional HTM-6.0, i.e., no performance loss.

TABLE 1

| | Video 1 | Video 2 | video/Video bitrate | video/total bitrate | synth/total bitrate | Enc time | Dec time | Ren time |
|---|---|---|---|---|---|---|---|---|
| Balloons | 0.0% | 0.0% | 0.0% | 0.0% | 0.0% | 99.9% | 98.6% | 102.1% |
| Kendo | 0.0% | 0.0% | 0.0% | 0.0% | 0.0% | 100.2% | 97.0% | 102.3% |
| Newspapercc | 0.0% | 0.0% | 0.0% | 0.0% | 0.0% | 100.7% | 94.5% | 100.5% |
| GhostTownFly | 0.0% | 0.0% | 0.0% | −0.1% | −0.1% | 99.7% | 101.8% | 101.5% |
| PoznanHall2 | 0.0% | 0.0% | 0.0% | 0.0% | 0.1% | 100.4% | 98.4% | 98.6% |
| PoznanStreet | 0.0% | 0.0% | 0.0% | 0.0% | 0.0% | 99.8% | 103.8% | 99.8% |
| UndoDancer | 0.0% | 0.0% | 0.0% | −0.1% | −0.2% | 99.9% | 95.5% | 102.2% |
| 1024 × 768 | 0.0% | 0.0% | 0.0% | 0.0% | 0.0% | 100.2% | 96.7% | 101.6% |
| 1920 × 1088 | 0.0% | 0.0% | 0.0% | −0.1% | 0.0% | 99.9% | 99.9% | 100.5% |
| average | 0.0% | 0.0% | 0.0% | 0.0% | 0.0% | 100.1% | 98.5% | 101.0% |

In Table 2, the performance of a 3D/multi-view video coding system incorporating an embodiment of the present invention, is compared with the performance of a conventional system based on HTM-6.0, where the VSP process uses DV determined from NBDV instead of DoNBDV. The BD-rate differences are shown for texture pictures in view 1 (video 1) and view 2 (video 2). The bitrate for view 1 is about the same as the conventional method and the bitrate increases slightly (0.1%) for view 2. The bitrate measure for texture video only (video/video bitrate) and the total bitrate, i.e., texture bitrate and depth bitrate (video/total bitrate) are about the same as the HTM-6.0. The total bitrate for synthesized video (synth./total bitrate) shows slight improvement (0.1%). As shown in Table 2, slight decrease in decoding time (2.2% in average) is noted. Accordingly, the system that uses the derived DV based on NBDV instead of DoNBDV to locate the corresponding depth block for VSP data generation achieves about the same or slightly better performance as the conventional HTM-6.0. As mentioned earlier, VSP based on NBDV accesses the depth block only once for each texture block, which cuts down the depth data access by half compared with the DoNBDV-based VSP.

Figure 8:
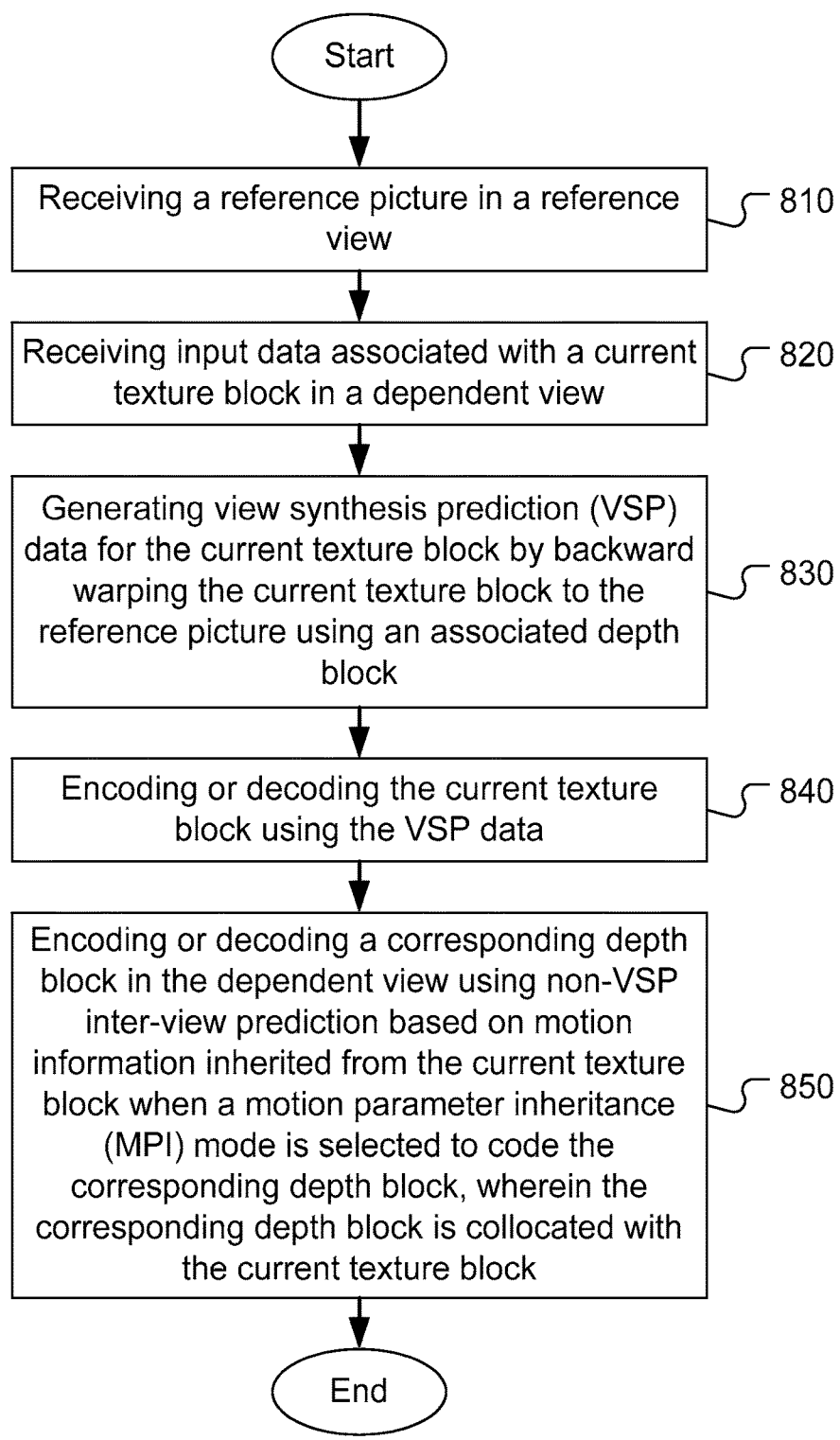
FIG. 8 illustrates an exemplary flowchart of an inter-view predictive coding system incorporating simplified view synthesis prediction process according to an embodiment of the present invention.

FIG. 8 illustrates an exemplary flowchart of a three-dimensional encoding or decoding system incorporating view synthesis prediction with reduced computational complexity and/or memory access bandwidth according to an embodiment of the present invention. The system receives a reference picture in a reference view as shown in step 810. For encoding, the texture picture in the reference view is coded and decoder. The reconstructed picture in the reference view is then used as the reference picture for coding the picture in the dependent view. The reference picture may be retrieved from memory (e.g., computer memory, buffer (RAM or DRAM) or other media) or from a processor. For decoding, the reference picture is reconstructed from bitstream. Input data associated with a current texture block in a dependent view is then received as shown in step 820. For encoding, the input data corresponds to pixel data (e.g., luma component or chroma components) of the current block. For decoding, the input data corresponds to coded data associated with the current block (e.g., VSP residues or inter-view residues). View synthesis prediction (VSP) data for the current texture block is then generated by backward warping the current texture block to the reference picture using an

TABLE 2

|  | Video 1 | Video 2 | video/Video bitrate | video/total bitrate | synth/total bitrate | Enc time | Dec time | Ren time |
| --- | --- | --- | --- | --- | --- | --- | --- | --- |
| Balloons | −0.1% | 0.0% | 0.0% | 0.0% | −0.1% | 100.4% | 96.9% | 101.1% |
| Kendo | 0.1% | 0.0% | 0.0% | 0.0% | 0.0% | 100.3% | 98.0% | 101.6% |
| Newspapercc | 0.0% | 0.1% | 0.0% | 0.0% | 0.0% | 100.1% | 95.5% | 100.5% |
| GhostTownFly | 0.1% | 0.2% | 0.0% | 0.0% | 0.0% | 100.3% | 95.8% | 99.7% |
| PoznanHall2 | −0.3% | −0.3% | −0.1% | −0.1% | −0.1% | 100.2% | 93.5% | 104.5% |
| PoznanStreet | 0.4% | 0.2% | 0.1% | 0.1% | 0.1% | 100.3% | 105.4% | 100.1% |
| UndoDancer | 0.1% | 0.2% | 0.0% | 0.0% | −0.4% | 100.7% | 99.6% | 95.5% |
| 1024 × 768 | 0.0% | 0.1% | 0.0% | 0.0% | 0.0% | 100.3% | 96.8% | 101.1% |
| 1920 × 1088 | 0.1% | 0.1% | 0.0% | 0.0% | −0.1% | 100.4% | 98.6% | 100.0% |
| average | 0.0% | 0.1% | 0.0% | 0.0% | −0.1% | 100.3% | 97.8% | 100.4% |

In Table 3, the performance of a 3D/multi-view video coding system incorporating an embodiment of the present invention, where the VSP process uses the DV determined from NBDV instead of DoNBDV and the VSP process is disabled for the depth data, is compared with the performance of a conventional system based on HTM-6.0. The results of BD-rate comparison are about the same as the case shown in Table 2. However, the decoding time is decreased by 4% compared with the conventional HTM-6.0. Accordingly, the system that disables VSP for depth map coding and uses NBDV for texture VSP achieves about the same or slightly better performance as the conventional HTM-6.0. However, the depth data access is cut down by half compared with the DoNBDV-based VSP.

associated depth block as shown in step 830. After the VSP data is generated, the VSP data is used to encode or decode the current texture block as shown in step 840. In order to reduce complexity or memory access, VSP is not applied to the depth data. Therefore, when a motion parameter inheritance (MPI) mode is selected to code the corresponding depth block, the corresponding depth block in the dependent view is encoded or decoded using non-VSP inter-view prediction based on motion information inherited from the current texture block as shown in step 850.

The flowcharts shown above are intended to illustrate examples of view synthesis prediction using reduced computational complexity and/or memory access. A person skilled in the art may modify each step, re-arranges the steps,

TABLE 3

|  | Video 1 | Video 2 | video/Video bitrate | video/total bitrate | coded & synth/total bitrate | Enc time | Dec time | Ren time |
| --- | --- | --- | --- | --- | --- | --- | --- | --- |
| Balloons | −0.1% | 0.0% | 0.0% | 0.0% | −0.1% | 100.4% | 96.9% | 101.1% |
| Kendo | 0.1% | 0.0% | 0.0% | 0.0% | 0.0% | 100.3% | 98.0% | 101.6% |
| Newspapercc | 0.0% | 0.1% | 0.0% | 0.0% | 0.0% | 100.1% | 95.5% | 100.5% |
| GhostTownFly | 0.1% | 0.2% | 0.0% | 0.0% | 0.0% | 100.3% | 95.8% | 99.7% |
| PoznanHall2 | −0.3% | −0.3% | −0.1% | −0.1% | −0.1% | 100.2% | 93.5% | 104.5% |
| PoznanStreet | 0.4% | 0.2% | 0.1% | 0.1% | 0.1% | 100.3% | 105.4% | 100.1% |
| UndoDancer | 0.1% | 0.2% | 0.0% | 0.0% | −0.4% | 100.7% | 99.6% | 95.5% |
| 1024 × 768 | 0.0% | 0.1% | 0.0% | 0.0% | 0.0% | 100.3% | 96.8% | 101.1% |
| 1920 × 1088 | 0.1% | 0.1% | 0.0% | 0.0% | −0.1% | 100.4% | 98.6% | 100.0% |
| average | 0.0% | 0.1% | 0.0% | 0.0% | −0.1% | 100.3% | 97.8% | 100.4% | split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for three-dimensional or multi-view video encoding, the method comprising:
   receiving a reference picture in a reference view;
   receiving input data associated with a first texture block and a second texture block in a dependent view;
   deriving a first disparity vector (DV) from a set of neighboring blocks of the first texture block;
   locating a first depth block from a reference depth map in the reference view according to the first DV and a location of the first texture block;
   generating view synthesis prediction (VSP) data for the first texture block by backward warping the first texture block to the reference picture using the first depth block,
   wherein the first depth block is located from a reference depth map in the dependent view according to a location of the first texture block and a selected disparity vector (DV),
   wherein the selected DV is derived using a Neighboring Block Disparity Vector (NBDV) process,
   wherein the selected DV is selected based on a first available DV from a set of neighboring blocks of the current texture block,
   wherein a selection process for the selected DV is determined adaptively in a sequence level, picture level, slice level, largest coding unit (LCU) level, coding unit (CU) level, prediction unit (PU) level, Macroblock level, or sub-block level, and
   wherein the selected DV that is derived using the NBDV process is utilized to fetch the depth block for VSP data generation, wherein the depth block is accessed by the selected DV only once for each texture block;
   encoding the first texture block using the VSP data;
   deriving a refined DV from a maximum value of a second depth block located according to a second DV derived from a set of neighboring blocks of the second texture block;
   deriving an inter-view Merge candidate using the refined DV and a location of the second texture block to locate a refined depth block from the reference depth map;
   encoding the second texture block using the inter-view Merge candidate; and
   encoding a corresponding depth block in the dependent view using non-VSP interview prediction based on motion information inherited from the first texture block while the first texture block is encoded using the VSP data,
   wherein the corresponding depth block is collocated with the first texture block.

2. The method of claim 1, wherein the selected DV is derived using a Depth oriented Neighboring Block Disparity Vector (DoNBDV) process, wherein a derived DV is selected based on a first available DV from a set of neighboring blocks of the current texture block, a selected depth block is located from the reference depth map according to the derived DV and the location of the current texture block, and the selected DV is derived from a maximum value of the selected depth block.

3. The method of claim 1, wherein a syntax element is used to indicate the selection process for the selected DV.

4. The method of claim 1, wherein the selection process for the selected DV is implicitly decided at encoder side and decoder side.

5. The method of claim 1, wherein the current texture block is divided into texture sub-blocks and each sub-block is predicted by sub-block VSP data generated by backward warping said each texture sub-block to the reference picture using the associated depth block.

6. The method of claim 1, wherein the current texture block corresponds to a prediction unit (PU).

7. The method of claim 1, wherein a derived DV is selected based on a first available DV from a set of neighboring blocks of the current texture block, a selected depth block is located from a reference depth map in the reference view according to the derived DV and the location of the current texture block, a refined DV is derived from a maximum value of the selected depth block, the refined DV and the location of the current texture block is used to locate a refined depth block from the reference depth map for deriving an interview Merge candidate.

8. The method of claim 1, wherein encoding the corresponding depth block using non-VSP inter-view prediction based on motion information inherited from the current texture block when a motion parameter inheritance (MPI) mode is selected to code the corresponding depth block.

9. A system comprising:
one or more electronic circuits configured to:
receive a reference picture in a reference view;
receive input data associated with a first texture block and a second texture block in a dependent view;
derive a first disparity vector (DV) from a set of neighboring blocks of the first texture block;
locate a first depth block from a reference depth map in the reference view according to the first DV and a location of the first texture block;
generate view synthesis prediction (VSP) data for the first texture block by backward warping the first texture block to the reference picture using the first depth block,
wherein the first depth block is located from a reference depth map in the dependent view according to a location of the first texture block and a selected disparity vector (DV),
wherein the selected DV is derived using a Neighboring Block Disparity Vector (NBDV) process, wherein the selected DV is selected based on a first available DV from a set of neighboring blocks of the current texture block,
wherein a selection process for the selected DV is determined adaptively in a sequence level, picture level, slice level, largest coding unit (LCU) level, coding unit (CU) level, prediction unit (PU) level, Macroblock level, or sub-block level, and
wherein the selected DV that is derived using the NBDV process is utilized to fetch the depth block for VSP data generation, wherein the depth block is accessed by the selected DV only once for each texture block;
encode the first texture block using the VSP data;
derive a refined DV from a maximum value of a second depth block located according to a second DV derived from a set of neighboring blocks of the second texture block;
derive an inter-view Merge candidate using the refined DV and a location of the second texture block to locate a refined depth block from the reference depth map;
encode the second texture block using the inter-view Merge candidate; and
encode a corresponding depth block in the dependent view using non-VSP inter-view prediction based on motion information inherited from the first texture block while the first texture block is encoded using the VSP data,
wherein the corresponding depth block is collocated with the first texture block.

10. An apparatus comprising:
processing circuitry configured to:
receive a reference picture in a reference view;
receive input data associated with a first texture block and a second texture block in a dependent view;
derive a first disparity vector (DV) from a set of neighboring blocks of the first texture block;
locate a first depth block from a reference depth map in the reference view according to the first DV and a location of the first texture block;
generate view synthesis prediction (VSP) data for the first texture block by backward warping the first texture block to the reference picture using the first depth block,
wherein the first depth block is located from a reference depth map in the dependent view according to a location of the first texture block and a selected disparity vector (DV),
wherein the selected DV is derived using a Neighboring Block Disparity Vector (NBDV) process,
wherein the selected DV is selected based on a first available DV from a set of neighboring blocks of the current texture block,
wherein a selection process for the selected DV is determined adaptively in a sequence level, picture level, slice level, largest coding unit (LCU) level, coding unit (CU) level, prediction unit (PU) level, Macroblock level, or sub-block level, and
wherein the selected DV that is derived using the NBDV process is utilized to fetch the depth block for VSP data generation,
wherein the depth block is accessed by the selected DV only once for each texture block;
encode the first texture block using the VSP data;
derive a refined DV from a maximum value of a second depth block located according to a second DV derived from a set of neighboring blocks of the second texture block;
derive an inter-view Merge candidate using the refined DV and a location of the second texture block to locate a refined depth block from the reference depth map;
encode the second texture block using the inter-view Merge candidate; and
encode a corresponding depth block in the dependent view using non-VSP inter-view prediction based on motion information inherited from the first texture block while the first texture block is encoded using the VSP data,
wherein the corresponding depth block is collocated with the first texture block.

11. A non-transitory computer-readable medium storing instructions that, when executed by one or more processors of a computing device, cause the computing device to:
receive a reference picture in a reference view;
receive input data associated with a first texture block and a second texture block in a dependent view;
derive a first disparity vector (DV) from a set of neighboring blocks of the first texture block;
locate a first depth block from a reference depth map in the reference view according to the first DV and a location of the first texture block;
generate view synthesis prediction (VSP) data for the first texture block by backward warping the first texture block to the reference picture using the first depth block,
wherein the first depth block is located from a reference depth map in the dependent view according to a location of the first texture block and a selected disparity vector (DV),
wherein the selected DV is derived using a Neighboring Block Disparity Vector (NBDV) process,
wherein the selected DV is selected based on a first available DV from a set of neighboring blocks of the current texture block,
wherein a selection process for the selected DV is determined adaptively in a sequence level, picture level, slice level, largest coding unit (LCU) level, coding unit (CU) level, prediction unit (PU) level, Macroblock level, or sub-block level, and
wherein the selected DV that is derived using the NBDV process is utilized to fetch the depth block for VSP data generation, wherein the depth block is accessed by the selected DV only once for each texture block;
encode the first texture block using the VSP data;
derive a refined DV from a maximum value of a second depth block located according to a second DV derived from a set of neighboring blocks of the second texture block;
derive an inter-view Merge candidate using the refined DV and a location of the second texture block to locate a refined depth block from the reference depth map;
encode the second texture block using the inter-view Merge candidate; and
encode a corresponding depth block in the dependent view using non-VSP inter-view prediction based on motion information inherited from the first texture block while the first texture block is encoded using the VSP data,
wherein the corresponding depth block is collocated with the first texture block.

* * * * *